Feb. 12, 1952     C. L. CARPENTER     2,585,737
CATALYTIC REFORMING PROCESS
Filed Oct. 21, 1948
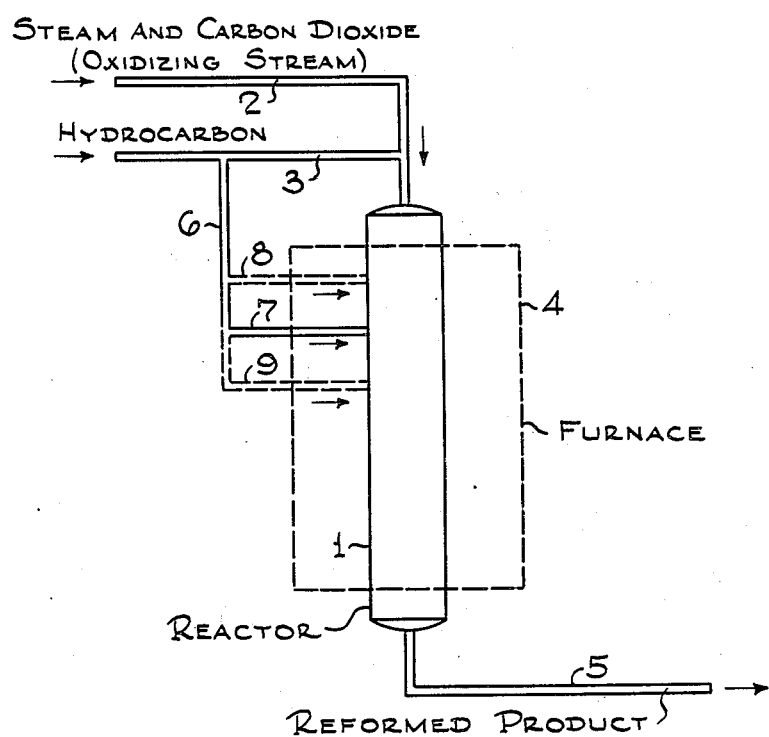
Clifford L. Carpenter   Inventor
By J. Cashman Attorney Patented Feb. 12, 1952

2,585,737

UNITED STATES PATENT OFFICE 2,585,737

CATALYTIC REFORMING PROCESS

Clifford Le Roy Carpenter, Brooklyn, N. Y., assignor to Standard Oil Development Company, a corporation of Delaware Application October 21, 1948, Serial No. 55,674

10 Claims. (Cl. 252—373)

The present invention relates to the production of a gas comprising carbon monoxide and hydrogen. It is more particularly concerned with the production of these gases by "reforming" a light hydrocarbon feed gas and is particularly directed to a process whereby the amount of "coke" formed on the catalyst during the reforming is maintained at a relatively low level. In accordance with the invention, to reduce coke formation, a portion of a hydrocarbon feed gas is introduced with carbon dioxide and/or steam, while the remainder is introduced at points further down the reactor where the temperature is higher. The gas thus produced may be used as a hydrocarbon synthesis feed gas, or as a source of hydrogen.

The reaction of methane reforming may be indicated by the following:

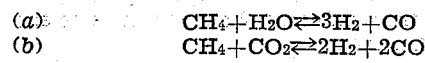

(a)  $CH_4 + H_2O \rightleftarrows 3H_2 + CO$
(b)  $CH_4 + CO_2 \rightleftarrows 2H_2 + 2CO$ By manipulation of the quantities of $CH_4$, $H_2O$ and $CO_2$ reacted, desired ratios of $H_2$ to $CO$ in the product may be obtained. The reaction results unavoidably in the formation of "coke" or carbonaceous material on the catalyst and, as indicated, the invention here resides in so manipulating the process as to suppress the tendency for coke to form and deposit on the catalyst.

The synthesis of hydrocarbons having 4 and more carbon atoms in the molecule from carbon monoxide and hydrogen in the presence of a suitable catalyst is a matter of record. The feed gases to a synthesis reaction of this character usually comprise a mixture of carbon monoxide and hydrogen. The ratio of these components varies somewhat between 1 to 2 volumes of hydrogen per volume of carbon monoxide. These feed gases are prepared from carbonaceous materials, as for example, coal, petroleum, coke, pitch, lignite, natural gas and gases from oil refining operations.

One good method of preparing gases comprising carbon monoxide and hydrogen is to "reform" methane or natural gas (about 95% $CH_4$) employing a catalyst comprising a metal in group VIII of the periodic system. Reforming is, as indicated, an oxidation of the methane by steam or carbon dioxide, or a mixture thereof, to form carbon monoxide and hydrogen, primarily. Particularly desirable catalysts comprise nickel or iron, either alone or supported on carriers such as kaolin or kieselguhr. The reaction is generally conducted by passing methane and steam and/or carbon dioxide over a catalyst such as nickel supported on kieselguhr at a temperature in the range from about 1300° F. to 2000° F. The preferred temperature range is from about 1500° F. to 1800° F. Pressures are maintained in the range from about 1 atmosphere to 300 lbs. per sq. in. gauge, preferably in the range from 0 lb. to 150 lbs. per sq. in. gauge.

One problem encountered in operations of this character is, as indicated, that "coke" i. e., carbonaceous deposits, form on the catalyst, necessitating frequent regeneration of the same. In accordance with the invention, the amount of coke formed on the catalyst is reduced, permitting its use on-stream for a longer period of time, before requiring regeneration and interruption of the productive phase. In accordance with the invention, one hydrocarbon stream is introduced into the reactor with the oxidizing stream, while at least one other portion of the hydrocarbon feed stream is introduced into the reactor further down stream, at a point which is at, or near, the region in the reactor where the equilibrium temperature for the reaction prevails. Preferably, the methane is added at several points.

The process of the invention may be readily understood by reference to the drawing illustrating one modification of the same. Steam and carbon dioxide, comprising the oxidizing stream, is introduced into reaction zone 1 by means of feed line 2. The hydrocarbon feed stream comprising methane is split and a portion introduced into the oxidizing stream in line 2 by means of line 3. The combined stream is then introduced into reactor 1 which is maintained at the desired temperature by means of furnace 4. A suitable known catalyst, such as nickel on kieselguhr is maintained in reaction zone 1. The reformed product after the desired time of contact with the catalyst is withdrawn from the reaction zone 1 by means of line 5 and handled in any desirable manner. In accordance with the invention, the hydrocarbon feed stream is split and a portion is withdrawn by means of line 6 and introduced at at least one point down stream in the reaction zone, as for example, by means of line 7. This point may be varied somewhat and this segregated portion of the feed introduced at point 8 or at point 9, or preferably at both points.

The invention, therefore, broadly comprises splitting the hydrocarbon stream and introducing portions of it at points within the reactor where the temperature is considerably in excess of the reactor inlet temperature.

It has been observed, in methane reformation in which all the methane is introduced through line 3, that coking occurs more readily in the upper part of the reactor. This would be expected because (1) the partial pressure of unreacted methane, which constituent is responsible for the coking, is highest at the top of the reactor, and (2) the water gas shift reaction, $$H + CO_2 \rightleftarrows CO + H_2O$$

goes well to the left at the relatively low temperatures prevailing towards the top of the reactor, thus depleting the supply of steam, which is a much more powerful oxidizing agent than carbon dioxide. By the addition of at least one portion of the methane at a lower point in the reactor, as proposed, the ratio of steam to methane in the upper zone of the reactor is increased, thus minimizing the danger of coking there, since the steam attacks the coke oxidizing it and preventing it from depositing on the catalyst.

This means that it is possible to reduce the amount of excess oxygen (over that theoretically required) to form a $(H_2+CO)$ mixture and at the same time provide a state throughout the reaction zone wherein the tendency for coke to form on the catalyst is suppressed. In this latter connection, advantage is taken of the "water-gas shift" reaction to supply excess oxygen in the form of water in sufficient quantity to the hydrocarbon streams introduced at the higher temperatures which would not have been available when required had all the hydrocarbon gas been introduced at one point at the inlet end of the reactor at its correspondingly lower temperature. The water thus made available tends to oxidize any carbon laid down by the reaction.

The remaining methane can then be safely introduced at a lower point because the methane added at the top has by now been largely consumed and because the higher temperatures prevailing at this lower point cause the above water-gas shift reaction to go towards the right, providing additional steam. Thus by operating in accordance with the present process, it is possible to reduce the amount of excess oxygen required to prevent formation of coke.

The invention may be applied to any conventional reforming operation for the production of a gas stream comprising hydrogen and carbon monoxide. It is, however, particularly adapted for reforming operations wherein the feed gas comprises methane or natural gas.

The extent to which the feed stream is split will, of course, depend upon various factors, such as, the character of the feed, the pressure and temperatures maintained in the reaction zone and the particular catalyst used, as well as, the extent of its activity. However, in general, it is preferred to introduce from about 10% to 50% of the feed into the reaction zone as a side stream or streams at a point or points below the point at which the oxidizing stream is introduced. Although the side stream may be introduced at a single point, it is preferred that it be introduced at a plurality of points below the point at which a portion of the feed and the oxidizing stream are introduced.

In the drawing, there is shown a jacketed reformer furnace. This may be replaced by a tube furnace resembling in structure a water tube steam boiler in which the catalyst is in the tubes and a fuel (such as natural gas) is burned in the spaces around the tubes in order to support the highly endothermic reaction of methane reforming. In this modification all hydrocarbon or methane streams would, of necessity, be connected to the interior of the tubes, but this could readily be accomplished by an experienced designer or engineer.

The process of the invention is not to be limited by any theory as to mode of operation, but only in and by the following claims in which it is desired to claim all novelty insofar as the prior art permits.

What is claimed is:

1. An improved continuous process for the preparation of a gaseous product comprising hydrogen and carbon monoxide which comprises continuously maintaining a reaction zone containing a reforming catalyst comprising an eighth group metal at a temperature in the range between about 1300° F. and 2000° F., continuously introducing into one extreme end of said zone a stream comprising a normally gaseous hydrocarbon and an oxidizing gas comprising stream and capable of reacting endothermically with said hydrocarbon in the presence of said catalyst at the aforesaid temperature, introducing at least one further portion of said hydrocarbon into said zone at the side thereof at a point downstream from where the stream of hydrocarbon and oxidizing gas is introduced and in a region where the temperature is in excess of that prevailing at said extreme end, the amount of oxidizing gas in the feed stream being in substantial excess of the amount required for conversion to carbon monoxide and hydrogen of the total amount of hydrocarbon feed whereby both portions of the hydrocarbon feed react endothermically with the oxidizing gas and the tendency of the reaction to deposit carbonaceous material on the catalyst is repressed, and continuously recovering the gaseous product from adjacent the other extreme end of the reaction zone.

2. The process as defined in claim 1 in which the normally gaseous hydrocarbon feed comprises methane and the reforming catalyst comprises nickel.

3. The process as defined in claim 1 in which the oxidizing gas comprises steam and carbon dioxide.

4. The process as defined in claim 1 in which 10 to 50% of the total hydrocarbon feed is introduced into the reaction zone at the side thereof and at a point downstream from where the stream of hydrocarbon and oxidizing gas is introduced.

5. The process as defined in claim 1 in which the normally gaseous hydrocarbon feed comprises methane and the oxidizing gas comprises steam and carbon dioxide.

6. The process as defined in claim 5 in which the total amount of methane added to the reaction zone is proportioned with respect to the steam and carbon dioxide also added to the reaction zone as to form a product gas containing hydrogen and carbon monoxide in the approximate volumetric ratio of from about 1:1 to 2:1.

7. An improved continuous process for the preparation of a gaseous product comprising hydrogen and carbon monoxide which comprises continuously maintaining a reaction zone containing a reforming catalyst comprising an eighth group metal and containing a promotional amount of an activator at a temperature in the range between about 1500° F. and 1800° F., continuously introducing into one extreme end of said zone a stream comprising a normally gaseous hydrocarbon and an oxidizing gas comprising steam and capable of reacting endothermically with said hydrocarbon in the presence of said catalyst at the aforesaid temperature, introducing at least one further portion of said hydrocarbon into said zone at the side thereof at a point downstream from where the stream of hydrocarbon and oxidizing gas is introduced and in a region where the temperature is in excess of that prevailing at said extreme end, the amount of oxidizing gas in the feed stream being in substantial excess of the amount required for conversion to carbon monoxide and hydrogen of the total amount of hydrocarbon feed whereby both portions of the hydrocarbon feed react endothermically with the oxidizing gas and the tendency of the reaction to deposit carbonaceous material on the catalyst is repressed, and continuously recovering the gaseous product from adjacent the other extreme end of the reaction zone.

8. The process as defined in claim 7 in which 10 to 50% of the total hydrocarbon feed is introduced into the reaction zone at the side thereof and at a point downstream from where the stream of hydrocarbon and oxidizing gas is introduced.

9. The process as defined in claim 7 in which the normally gaseous hydrocarbon feed comprises methane and the oxidizing gas comprises steam and carbon dioxide.

10. The process as defined in claim 9 in which the total amount of methane added to the reaction zone is proportioned with respect to the steam and carbon dioxide also added to the reaction zone as to form a product gas containing hydrogen and carbon monoxide in the approximate volumetric ratio of from about 1:1 to 2:1.

CLIFFORD LE ROY CARPENTER.

REFERENCES CITED

The following references are of record in the file of this patent:

UNITED STATES PATENTS

| Number | Name | Date |
|---|---|---|
| 1,834,115 | Williams | Dec. 1, 1931 |
| 1,904,592 | Young et al. | Apr. 18, 1933 |
| 1,904,908 | Voorhees | Apr. 18, 1933 |
| 1,957,743 | Wietzel et al. | May 8, 1934 |
| 1,959,151 | Beekley | May 15, 1934 |
| 2,164,292 | Jerness | June 27, 1939 |
| 2,278,892 | Nagle | Apr. 7, 1942 |
| 2,425,754 | Murphree et al. | Aug. 19, 1947 |
| 2,442,093 | Milbourne | May 25, 1948 |
| 2,448,290 | Atwell | Aug. 31, 1948 |

FOREIGN PATENTS

| Number | Country | Date |
|---|---|---|
| 314,944 | Great Britain | Jan. 17, 1930 |